Aug. 19, 1969 H. SEIDEL 3,462,612

PARAMETRIC FILTER

Filed Aug. 19, 1966

INVENTOR
H. SEIDEL
BY
Sylvan Sherman
ATTORNEY 3,462,612
PARAMETRIC FILTER
Harold Seidel, Fanwood, N.J., assignor to Bell Telephone Laboratories, Incorporated, Murray Hill, N.J., a corporation of New York
Filed Aug. 19, 1966, Ser. No. 573,589
Int. Cl. H03k *3/47;* H03f *7/00*
U.S. Cl. 307—88.3 4 Claims This invention relates to narrow band filters utilizing the principles of parametric interaction.

It is well known that when a parametric amplifier, supportive of wave energy at frequencies $f_1$ and $f_2$, is "pumped" sufficiently hard at a frequency $f_3$, such that $f_3=f_1+f_2$, the system oscillates at both frequencies $f_1$ and $f_2$. The present invention utilizes this property of parametric interaction as a means of producing narrow band wave energy.

In accordance with the present invention, a "noisy" (or broadband) power source is used as the "pump" to excite a "signal" circuit into oscillations at a somewhat lower frequency. The bandwidth of the signal circuit is made much narrower than the spectral width of the pump power source. The idler circuit bandwith, on the other hand, is made equal to or broader than that of the pump power source. Since the bandwidth of the signal derived from the cavity is closely related to the ratio of the signal circuit Q to the idler circuit Q, significant filtering can be realized with very little loss of energy.

A further reduction in bandwidth can be realized by repeating the process, using the first signal circuit output as the "pump" in a second, similar parametric oscillator circuit. In addition, a subharmonic of the signal frequency, derived from a well regulated source, can be coupled into the signal to phase lock the signal oscillations, thereby further narrowing the bandwidth of the output signal.

It is a feature of the present invention that energy distributed over a broad frequency spectrum, can be preserved and concentrated within a much narrower frequency spectrum with considerably less loss of energy than would be realized by simply passing the same broadband energy through a band-limiting network. Furthermore, since an equivalent negative resistance is generated by the parametric processes, a much narrower band signal can be obtained in accordance with the invention than is conveniently possible using passive elements.

Figure 1:
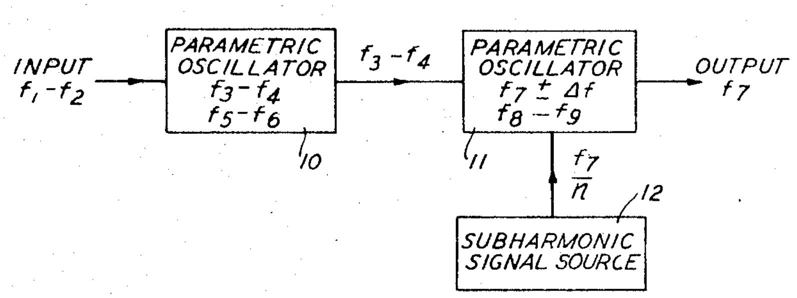
Figure 2:
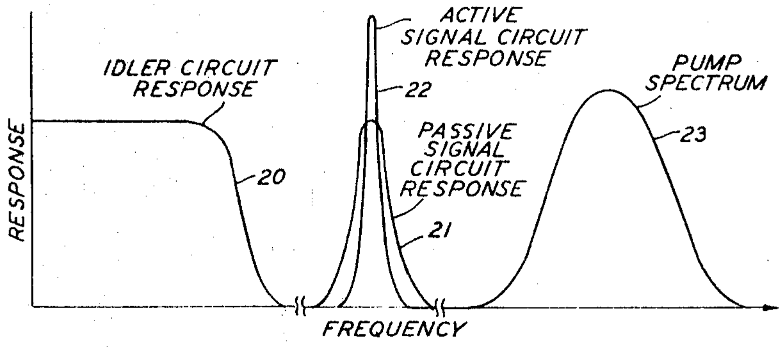
Figure 3:
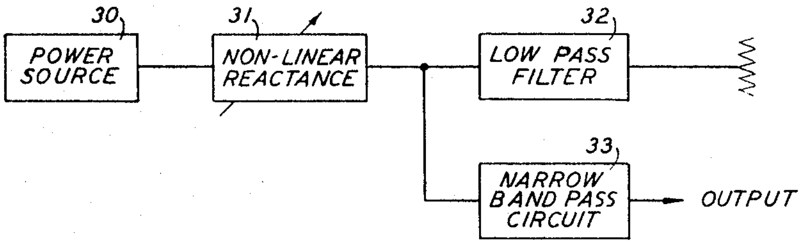

These and other objects and advantages, the nature of the present invention, and its various features, will appear more fully upon consideration of the various illustrative embodiments now to be described in detail in connection with the accompanying drawings, in which:

FIG 1. is a block diagram of a two-stage filter in accordance with the invention;

FIG. 2 shows the bandpass characteristics of the idler and signal circuits, and the pump spectrum; and FIG. 3 is the block diagram of a one-stage parametric filter having the frequency characteristics illustrated in FIG. 2.

Referring to the drawings, FIG. 1 shows, in block diagram, a two-stage filter using two parametric oscillator stages 10 and 11 and a subharmonic signal source 12 for phase-locking the second parametric oscillator at the signal frequency. Each of the oscillators can be any one of the many parametric devices known in the art. Specifically, they may utilize the parametric interaction produced in gyromagnetic materials, as described in United Patent No. 2,978,649 issued to M. T. Weiss, or they may utilize a varactor diode as the nonlinar reactive element, as described by E. D. Reed in his articles entitled "Diode Parametric Amplifiers—Principles and Experiments," published in Semiconductor Products, Part I, January 1961, pp. 25–30, Part II, February 1961, pp. 35–42.

In accordance with the invention, however, the bandwidths of the "signal" and "idler" circuits are adjusted in a manner to be described more fully hereinbelow.

In FIG. 1, the input wave energy is shown to include insignificant frequency components within a broad frequency range $f_1$ to $f_2$. To obtain narrowing of this spectrum, each of these components is frequency shifted by means of parametric interaction to a lower frequency with a narrower frequency range $f_3$ to $f_4$. Advantageously, this frequency range is made as narrow as possible by making the Q of the "signal" circuit as high as possible. Since each "pump" frequency component must be equal to the sum of the "signal" frequency and the "idler" frequency, the idler circuit advantageously has a bandwidth $f_5$ to $f_6$ whose limits are approximately given by $$f_5<(f_1-f_4)$$

and $$(f_2-f_3)<f_6<f_3$$

Since the bandwidth of the signal derived from the signal circuit is given, in part, by the ratio of the $Q_S$ of the signal circuit to the $Q_i$ of the idler circuit, the "idler" circuit preferably has a very low $Q_i$ and, hence, has an extremely broad bandwidth. Advantageously the ratio of idler bandwidth to signal bandwidth is of the order of 100 or greater. This insures that for each pump component there is a corresponding idler component such that the difference frequency, which defines the signal freqeuncy, falls within a narrow band. In addition, since any change in pump frequency is reflected in a change in both idler and signal frequencies, a low Q idler circuit results in most of this change taking place at the idler frequency, and correspondingly less change occurring at the signal frequency.

FIG. 2 shows the bandpass characteristic of the idler and signal circuits, and the pump spectrum. In this illustration, the idler circuit response is represented by a low-pass filter characteristic 20, for maximum filtering. The sigal circuit response includes two curves. The first curve 21 shows the passive characteristic of the signal circuit. The second curve 22, superimposed upon the first, shows the narrowing of the signal circuit characteristic due to the negative resistance generated by parametric interaction. Curve 23 shows the broad spectral distribution of the input signal.

FIG. 3 is a block diagram of a one-stage parametric filter having the frequency characteristics illustrated in FIG. 2. The filter comprises a power source 30, a nonlinear reactance 31, a resistively terminated low-pass filter 32, and a narrow bandpass circuit 33.

In a multistage filter, the output signal derived from circuit 33 becomes the power source for the next, following filter stage. Thus, referring again to FIG. 1, the output $f_3$—$f_4$ is used to pump the second parametric oscillator 11, which is characteristized by a signal bandwidth $f_7\pm\Delta f$, and an idler bandwidth $f_8$—$f_9$, where, as above, the idler bandwidth is much broader than the signal bandwidth. For those applications wherein a high degree of spectral purity is required, the signal can be phase locked by the injection into the signal circuit of a well regulated, crystal-controlled subharmonic of the signal frequency. Thus, FIG. 1 also includes a subharmonic signal source 12 coupled to oscillator 11. Designating the desired output signal frequency $f_7$, subharmonic source 12 is operated at a frequency $f_7/n$, where $n$ is any positive integer other than zero.

In all cases it is understood that the above-described arrangements are illustrative of but a small number of the many possible specific embodiments which can represent applications of the principles of the invention. Thus, numerous and varied other arrangements can readily be devised in accordance with these principles by those skilled in the art without departing from the spirit and scope of the invention.

What is claimed is:

1. A parametric filter comprising:

a source of electromagnetic wave energy having significant frequency components extending over a broad band of frequencis;

a parametric oscillator including a signal circuit and an idler circuit;

said signal circuit having a bandpass characteristic that is narrower than said band of frequencies;

said idler circuit having a bandpass characteristics that is comparable to or broader than said band of frequencies;

means for coupling said source to said oscillator thereby providing pumping energy for said oscillator; and means for extracting wave energy from said signal circuit.

2. The filter according to claim 1 including means for phase locking one of the signal components lying within the bandpass characteristic of said signal circuit.

3. The filter according to claim 2 wherein said phase locking means comprises a second oscillator tuned to a subharmonic of said signal component.

4. The filter according to claim 1 wherein the bandpass characteristic of said idler circuit is that of a lowpass filter.

References Cited

UNITED STATES PATENTS 2,978,649 4/1961 Weiss ______________ 307—88.3

JOHN KOMINSKI, Primary Examiner

DARWIN R. HOSTETTER, Assistant Examiner

U.S. Cl. X.R.

321—69; 330—4.5; 331—50, 55, 77, 172; 333—70